(12) United States Patent
Anabuki et al.

(10) Patent No.: US 10,703,026 B2
(45) Date of Patent: Jul. 7, 2020

(54) METHOD FOR PRODUCING CORK STOPPER AND CORK STOPPER

(71) Applicant: Uchiyama Manufacturing Corp., Okayama-shi, Okayama (JP)

(72) Inventors: Akihiro Anabuki, Okayama (JP); Tatsuo Katayama, Akaiwa (JP); Tomohisa Yamamoto, Okayama (JP)

(73) Assignee: UCHIYAMA MANUFACTURING CORP., Okayama-Shi, Okayama (JP)

( * ) Notice: Subject to any disclaimer, the term of this patent is extended or adjusted under 35 U.S.C. 154(b) by 3 days.

(21) Appl. No.: 16/134,184

(22) Filed: Sep. 18, 2018

(65) Prior Publication Data

US 2019/0084199 A1 Mar. 21, 2019

(30) Foreign Application Priority Data

Sep. 19, 2017 (JP) .................................. 2017-179541

(51) Int. Cl.
*B29C 43/52* (2006.01)
*B65D 39/00* (2006.01)
*B29C 43/00* (2006.01)
*B29C 35/08* (2006.01)
*B29C 43/02* (2006.01)
(Continued)

(52) U.S. Cl.
CPC ................ *B29C 43/52* (2013.01); *B27K 7/00* (2013.01); *B27N 5/00* (2013.01); *B27N 7/00* (2013.01); *B29C 35/0805* (2013.01); *B29C 43/003* (2013.01); *B29C 43/027* (2013.01); *B65D 39/0058* (2013.01); *B29C 2035/0855* (2013.01); *B29C 2043/029* (2013.01); *B29K 2103/00* (2013.01); *B65D 39/0011* (2013.01)

(58) Field of Classification Search
CPC combination set(s) only.
See application file for complete search history.

(56) References Cited

U.S. PATENT DOCUMENTS

| 997,056 A | * | 7/1911 | Grünzweig | ................ B27J 5/00 264/124 |
| 1,607,047 A | * | 11/1926 | Bertelsen, Jr. | ........... B27N 3/02 264/124 |

(Continued)

FOREIGN PATENT DOCUMENTS

| EP | 2179828 A1 | 4/2010 |
| EP | 2921419 A1 | 9/2015 |

(Continued)

OTHER PUBLICATIONS

English-language machine translation of WO-02068311-A2, downloaded from Espacenet on Nov. 15, 2019.*

(Continued)

*Primary Examiner* — Nicholas E Hill
(74) *Attorney, Agent, or Firm* — Buchanan Ingersoll & Rooney PC

(57) ABSTRACT

An objective of the present invention is to provide a method for producing a cork stopper by compression molding cork grains, which can provide a cork stopper excellent in sealability and safety. There is provided a method for producing a cork stopper, comprising: mixing cork grains and an adhesive; compression molding the mixture to give an intermediate; and then heating the intermediate to expand the cork grains.

14 Claims, 8 Drawing Sheets

(51) Int. Cl.
*B27N 7/00* (2006.01)
*B27K 7/00* (2006.01)
*B27N 5/00* (2006.01)
*B29K 103/00* (2006.01)

(56) References Cited

U.S. PATENT DOCUMENTS

| | | | | |
|---|---|---|---|---|
| 2,307,055 A | * | 1/1943 | Menger | B27J 5/00 |
| | | | | 425/97 |
| 2,336,193 A | * | 12/1943 | Schrader | B29C 48/475 |
| | | | | 428/35.6 |
| 4,042,543 A | * | 8/1977 | Stickman | C08L 23/06 |
| | | | | 524/16 |
| 5,317,047 A | | 5/1994 | Sabate et al. | |
| 5,352,417 A | * | 10/1994 | Konishi | B01D 11/0219 |
| | | | | 366/219 |
| 2010/0117270 A1 | | 5/2010 | Alac | |
| 2015/0166223 A1 | * | 6/2015 | Yamamoto | B65D 39/0011 |
| | | | | 215/364 |
| 2015/0266629 A1 | * | 9/2015 | Anabuki | B65D 39/0011 |
| | | | | 215/364 |

FOREIGN PATENT DOCUMENTS

| | | | | |
|---|---|---|---|---|
| JP | H06505760 A | | 6/1994 | |
| JP | 2010099909 A | | 5/2010 | |
| WO | WO-02068311 A2 | * | 9/2002 | B67B 1/03 |
| WO | 2008/115086 A1 | | 9/2008 | |
| WO | WO-2008115086 A1 | * | 9/2008 | B27K 5/0055 |

OTHER PUBLICATIONS

Luis Gil and Cristina Moiteiro, "Cork," 10 Ullmann's Encyclopedia of Industrial Chemistry 303 (published online 2003).*
Extended Search Report issued by the European Patent Office in corresponding European Patent Application No. 18195163.3-1019 dated Feb. 27, 2019 (6 pages).

* cited by examiner

[FIG. 1]

[FIG. 2]
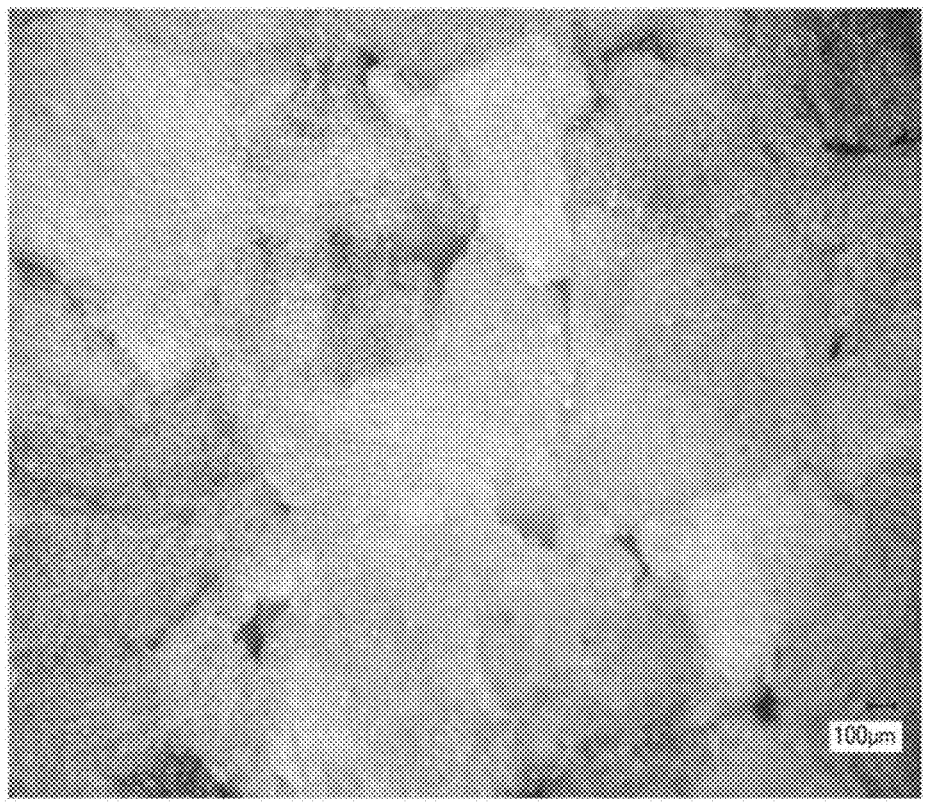
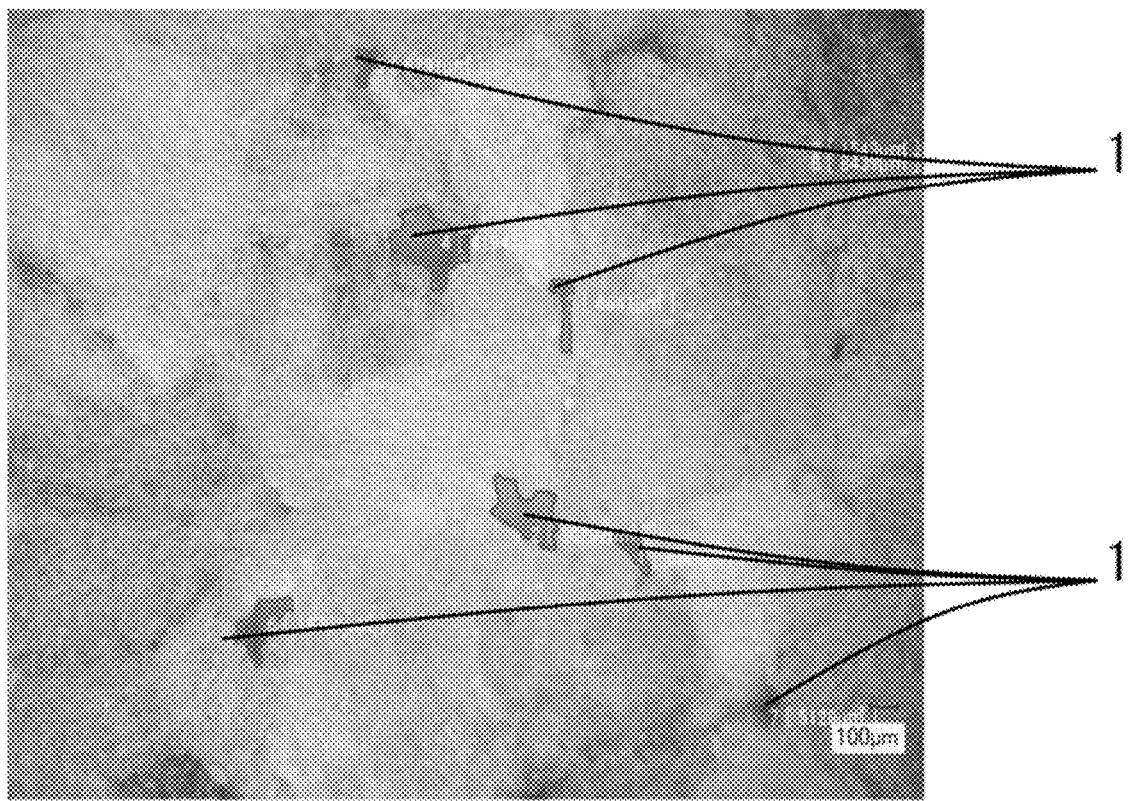

[FIG. 3]

[FIG. 4]
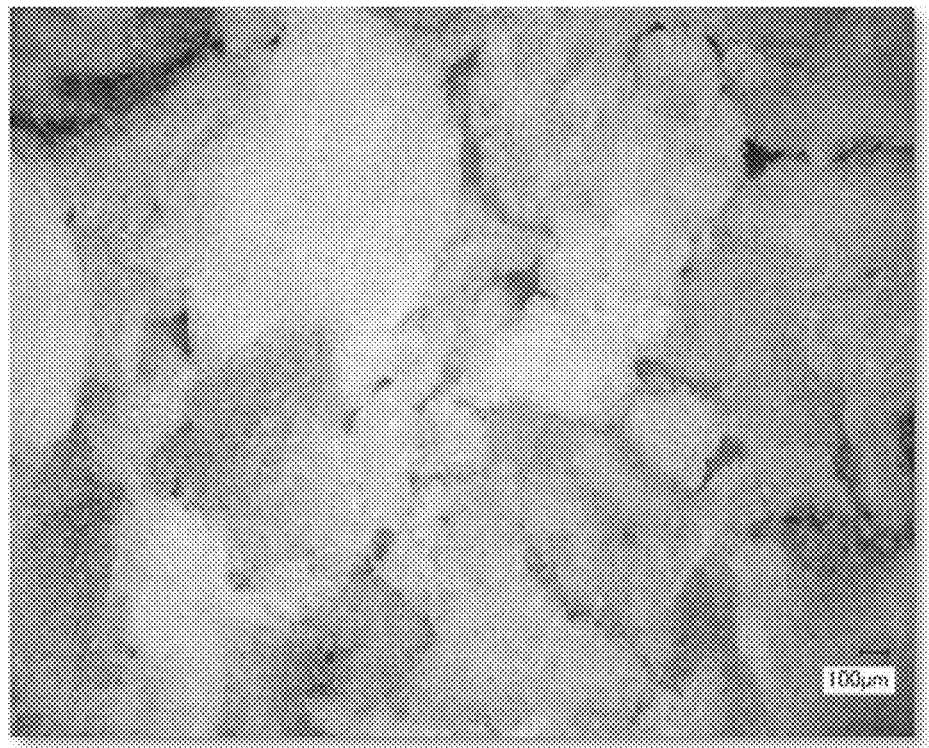
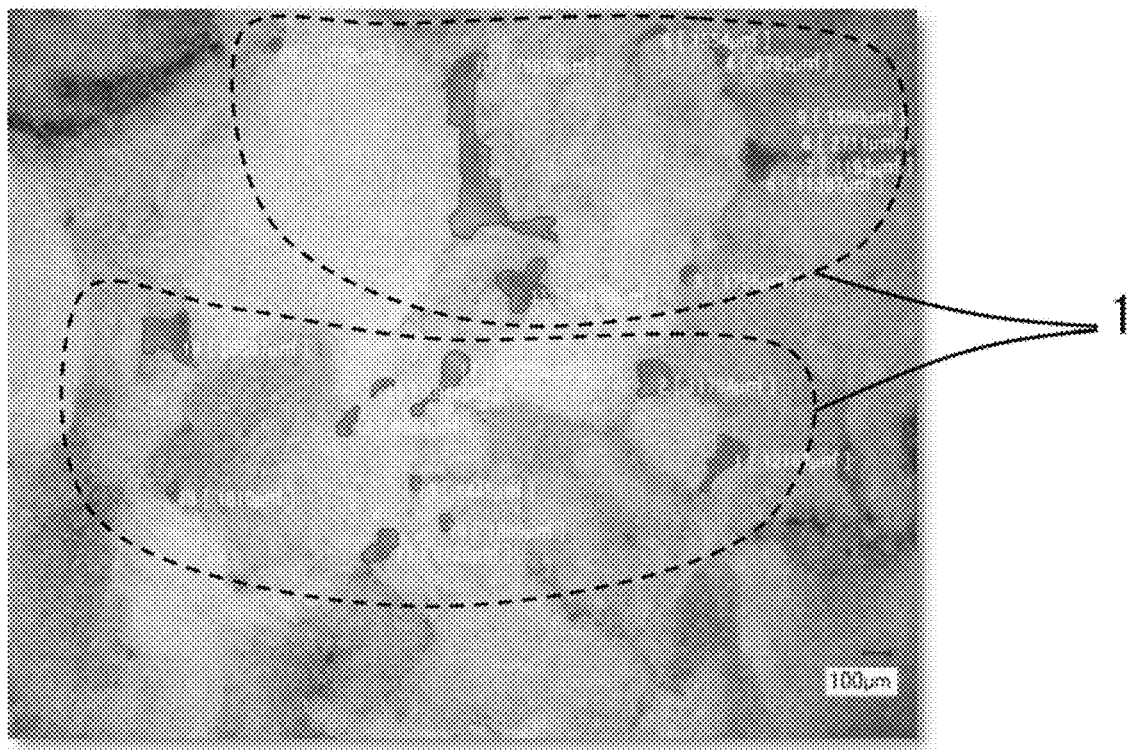

[FIG. 5]
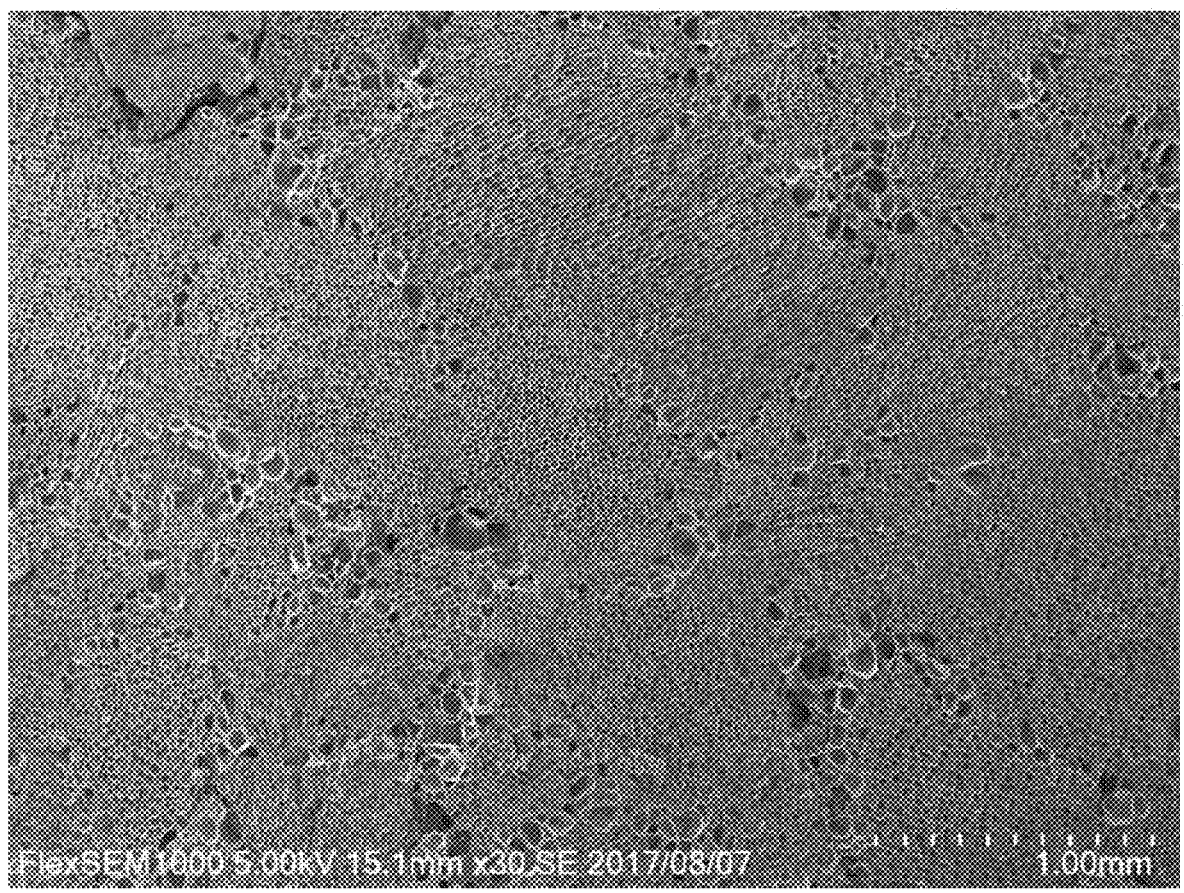

[FIG. 6]
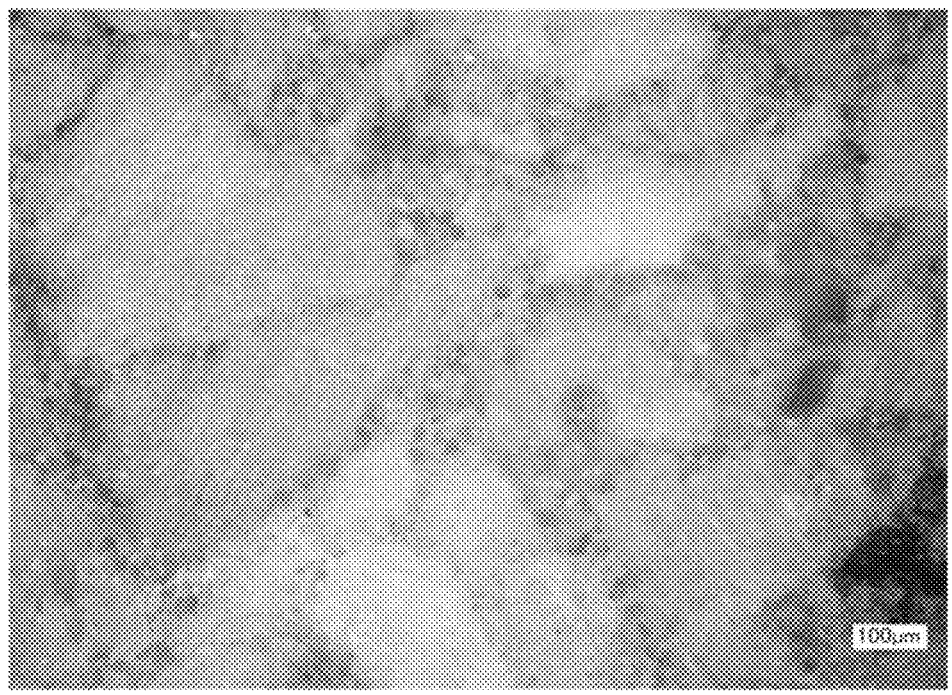
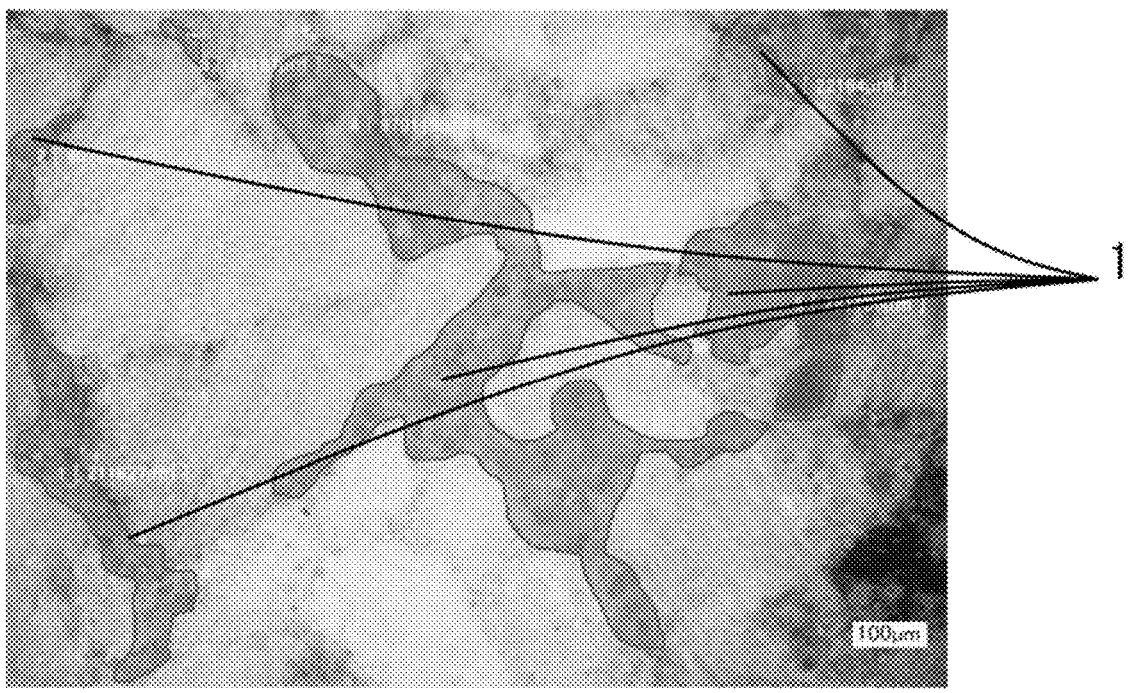

[FIG. 7]

[FIG. 8]
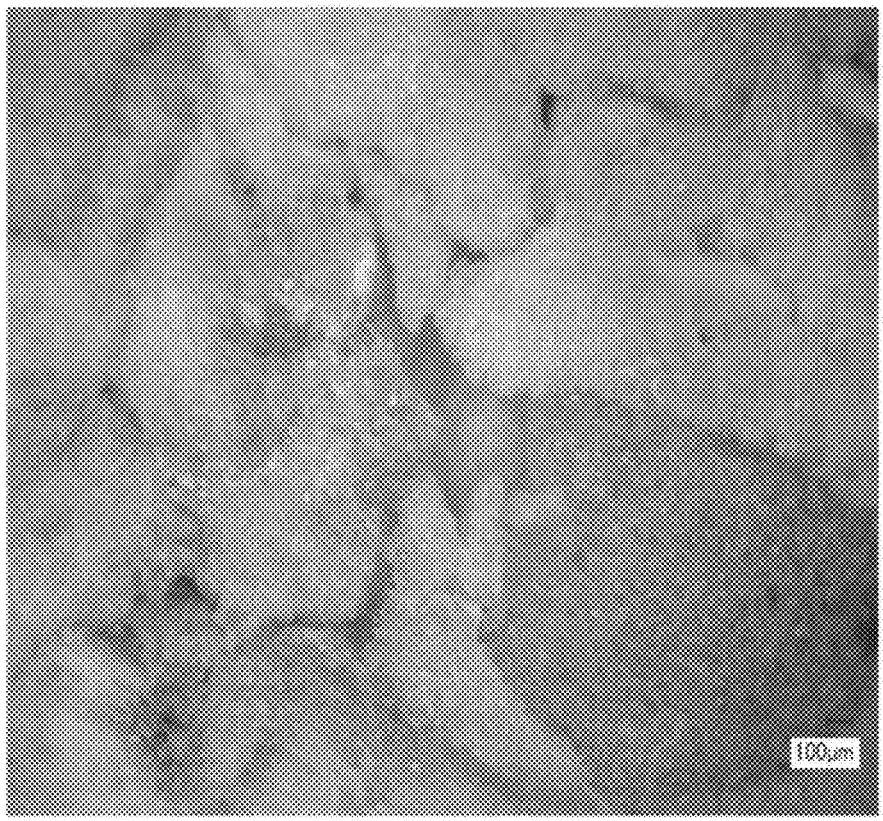
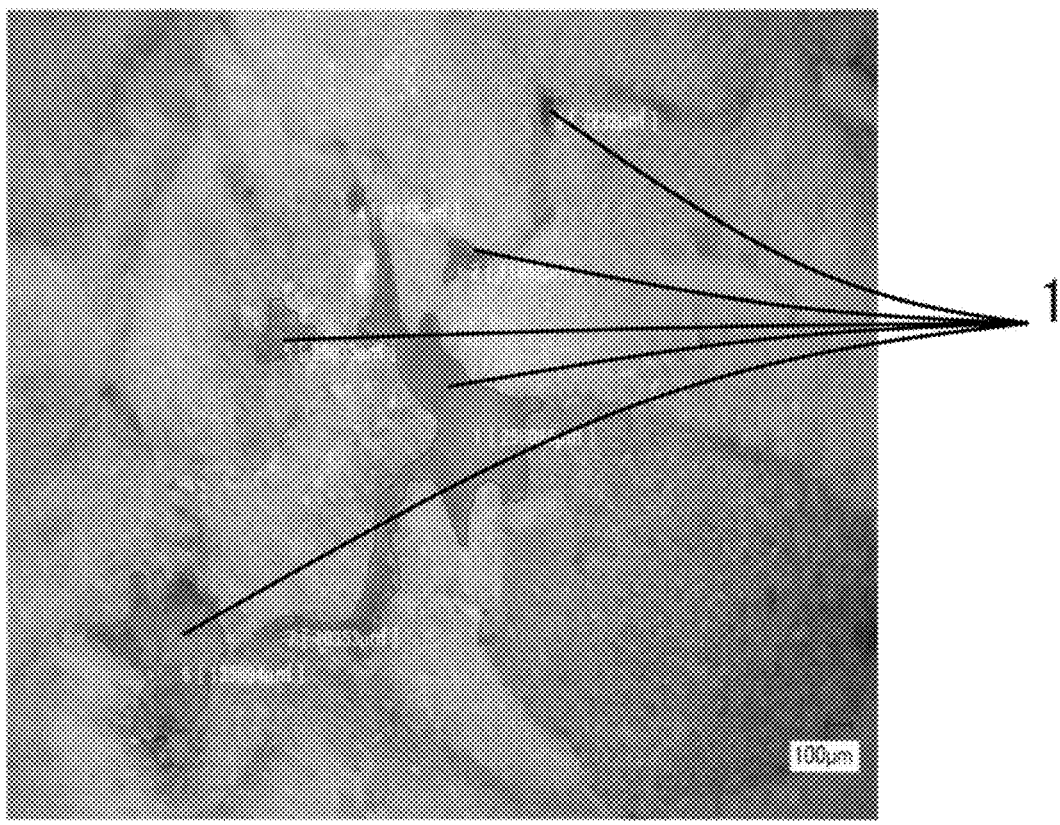

METHOD FOR PRODUCING CORK STOPPER AND CORK STOPPER

TECHNICAL FIELD

The present invention relates to a method for producing a cork stopper comprising compression molding cork grains. It also relates to a cork stopper produced by compression molding cork grains.

BACKGROUND ART

Cork stoppers have been used as a stopper for sealing a beverage container such as a wine bottle through the ages because they exhibit good seal performance and have unique texture.

Compressed cork stoppers produced by compression molding cork grains and an adhesive have been extensively used since they are advantageous in cost or the like and advantageous in the environment because cork grains obtained by pulverizing scraps generated during producing a natural-cork stopper can be used as a starting material. However, there have been the problems that a liquid as a content may permeate a compressed cork stopper and gas barrier performance may be insufficient, and thus improvement of sealability has been needed.

Various techniques have been developed for solving such problems. Patent Reference No. 1 has described a stopper produced by placing cork powder, thermally expandable microspheres containing an expansion agent consisting of hydrocarbon such as isobutane in an outer shell made of a copolymer of methyl methacrylate and acrylonitrile, a polyurethane adhesive and so on, in a mold, and then heating the mixture. However, a cork stopper obtained may be insufficient in sealability. Furthermore, a content may be contaminated with acrylonitrile contained in the microspheres, which is also problematic in safety. Patent Reference No. 2 has described a method for producing a cork stopper by compressing a mixture of cork grains and a binder resin along a direction perpendicular to a longitudinal direction of the cork stopper when the mixture is compression molded to provide a columnar cork stopper. However, a cork stopper obtained may be insufficient in sealability.

PRIOR ART REFERENCES

Patent References

Patent Reference No. 1: JP 6-505760 A
Patent Reference No. 2: JP 2010-99909 A

SUMMARY OF THE INVENTION

Problems to be Solved by the Invention

To solve the above problems, an objective of the present invention is to provide a method for producing a cork stopper by compression molding cork grains, which can provide a cork stopper excellent in sealability and safety. Another objective is to provide such a cork stopper.

Means for Solving the Problems

The above problems are solved by providing a method for producing a cork stopper, comprising: mixing cork grains and an adhesive; compression molding the mixture to give an intermediate; and then heating the intermediate to expand the cork grains. Here, it is preferable that the cork grains are expanded by internal heating of the intermediate. It is further preferable that the cork grains are expanded by microwave heating or high-frequency heating of the intermediate.

In the above production method, it is preferable that the intermediate is approximately cylindrical, and the cork grains and the adhesive are mixed and then compression molded while being compressed in a direction perpendicular to a rotation axis. It is also preferable that the intermediate is placed in a cavity of a mold, and then the intermediate is heated to expand the cork grains. Here, it is preferable that the approximately cylindrical intermediate with a diameter A (mm) is placed in the approximately cylindrical cavity with a diameter B (mm), and A and B satisfy the following formula (1).

$$1.01 \leq B/A \leq 1.2 \tag{1}$$

The above problems can be solved by providing a method for producing a cork stopper, comprising: mixing cork grains and an adhesive; compression molding the mixture to give an intermediate; placing the intermediate in the cavity of the mold at 0 to 40° C. while keeping the intermediate at 80° C. or higher; and allowing the intermediate to stand to expand the cork grains; wherein the intermediate is approximately cylindrical with a diameter C (mm), the cavity is approximately cylindrical with a diameter D (mm), and C and D satisfy the following formula (2).

$$1.01 \leq D/C \leq 1.2 \tag{2}$$

A suitable embodiment of the present invention is an approximately cylindrical cork stopper produced by mixing cork grains and an adhesive and then compression molding the mixture, wherein a filling rate of the cork grains in a cross section in a direction perpendicular to a rotation axis is 97% or more. In this cork stopper, it is preferable that a ratio ($S_2/S_1$) of a strength $S_2$ (N/mm²) in a direction perpendicular to a rotation axis to a strength $S_1$ (N/mm²) in a rotation axis direction is 0.65 to 0.78. It is also preferable that a ratio ($R_2/R_1$) of a compression recovery rate $R_2$ (%) in a direction perpendicular to a rotation axis to a compression recovery rate $R_1$ (%) in a rotation axis direction is 1.005 to 1.2. It is also preferable that a density of the cork stopper is 0.26 to 0.32 g/cm³.

Effects of the Invention

According to a production method of the present invention, a cork stopper produced by compression molding which is excellent in sealability and safety can be obtained.

BRIEF DESCRIPTION OF THE DRAWINGS

FIG. 1 is an electron microscope image of a cross section perpendicular to a rotation axis in the middle of a cork stopper in Example 1.

FIG. 2 is a light microscope image of a cross section perpendicular to a rotation axis in the middle of a cork stopper in Example 1.

FIG. 3 is an electron microscope image of a cross section perpendicular to a rotation axis in the middle of an intermediate before expansion in Example 1.

FIG. 4 is a light microscope image of a cross section perpendicular to a rotation axis in the middle of an intermediate before expansion in Example 1.

FIG. 5 is an electron microscope image of a cross section perpendicular to a rotation axis in the middle of a cork stopper in Comparative Example 1.

FIG. 6 is a light microscope image of a cross section perpendicular to a rotation axis in the middle of a cork stopper in Comparative Example 1.

FIG. 7 is an electron microscope image of a cross section perpendicular to a rotation axis in the middle of a cork stopper in Comparative Example 2.

FIG. 8 is a light microscope image of a cross section perpendicular to a rotation axis in the middle of a cork stopper in Comparative Example 2.

MODES FOR CARRYING OUT THE INVENTION

A production method of the present invention is a method for producing a cork stopper, comprising: mixing cork grains and an adhesive; compression molding the mixture to give an intermediate; and then heating the intermediate to expand the cork grains. This method can be referred to as "the first production method".

First, cork grains and an adhesive are mixed to give a mixture. Starting cork grains are obtained by crushing a cork tissue in a bark of cork oak which is commonly used for producing a compressed cork stopper. The cork grains can be a crushed scrap generated during producing a natural-cork stopper.

An average particle size of the cork grains is preferably 0.1 to 5 mm. By using cork grains having such an average particle size, a cork stopper having proper hardness can be produced, so that screwing of an opener and removal of a stopper become smoother and sealability is improved. If the average particle size is less than 0.1 mm, a cork stopper obtained is so hard that screwing of an opener or removal of a stopper may be difficult. The average particle size is more preferably 0.5 mm or more, further preferably 1 mm or more. Meanwhile, if the average particle size is more than 5 mm, voids become easily generated in a cork stopper, leading to deterioration in sealability. The average particle size is more preferably 3 mm or less, further preferably 2 mm or less.

Examples of an adhesive used in the present invention include, but not limited to, urethane adhesives and epoxy adhesives, and among these, urethane adhesives are preferable. The amount of the adhesive is suitably 1 to 40 parts by mass based on 100 parts by mass of the cork grains. If the amount of the adhesive is less than 1 part by mass, mechanical properties of the cork stopper may be insufficient and voids become easily generated in a cork stopper, leading to deterioration in sealability. The amount of the adhesive is more preferably 3 parts by mass or more, further preferably 8 parts by mass or more. Meanwhile, if the amount of the adhesive is more than 40 parts by mass, a cork stopper obtained is so hard that screwing of an opener or removal of the stopper may be difficult. The amount of the adhesive is more preferably 30 parts by mass or less, further preferably 20 parts by mass or less.

It is preferable that in addition to the cork grains and the adhesive, water is added. Thus, when the cork grains are expanded by internal heating, the cork grains is efficiently heated, allowing for easy expansion of the cork grains. Furthermore, water may be needed for curing the adhesive. The amount of water is suitably 1 to 30 parts by mass based on 100 parts by mass of the cork grains. If the amount of water is less than 1 part by mass, the above effects may not be achieved. The amount of water is more preferably 5 parts by mass or more. Meanwhile, the amount of water is more than 30 parts by mass, moldability may be deteriorated. The amount of water is more preferably 20 parts by mass or less.

Without the effects of the present invention being inhibited, other additives can be, besides the cork grains, the adhesive and water, further added. An example of the additive is polyethylene glycol. A total amount of the additives is generally 10 parts by mass or less, preferably 5 parts by mass or less, more preferably 1 part by mass or less based on 100 parts by mass of the cork grains.

There are no particular restrictions to a method for mixing the cork grains and the adhesive; for example, mixing the cork grains, the adhesive and, as necessary, water and/or other additives by a mixer or the like.

The mixture obtained is compression molded to give an intermediate. There are no particular restrictions to a method for compression molding of the mixture, and preferred is loading the mixture into a cavity of a mold for compression molding (hereinafter, a mold for compression molding is sometimes referred as a "first mold") and then compression molding the mixture. In compression molding of the mixture, a compressibility of the mixture calculated from the following equation is preferably 40 to 70%.

Compressibility (%)=100×Volume of an intermediate after compression/Volume of a mixture before compression There are no particular restrictions to a shape of the intermediate, which can be determined in accordance with a shape of a cork stopper. Particularly, it is preferable that the intermediate is approximately cylindrical. Such an approximately cylindrical intermediate is preferably produced by compression molding the mixture while compressing the mixture in a direction perpendicular to a rotation axis. By compression molding the mixture and then expanding the cork grains as described above, sealability can be considerably improved while keeping smoothness of screwing of an opener and removal of a stopper. Such an intermediate is produced by a method described in JP 2010-99909 A or the like.

In the above production method, it is preferable that in addition to the step of heating the intermediate to expand the cork grains, the obtained intermediate is preheated in a cavity of a mold. Partial curing of the adhesive by preheating the intermediate becomes easy to handle. Here, the mixture can be loaded into the cavity of the first mold and compression molded, followed by preheating of the intermediate obtained in the cavity. However, in the light of productivity, it is preferable that the mixture is loaded into the cavity of the first mold and compression molded, and then the intermediate obtained is loaded in a cavity of a preheating mold and preheated. A size of the cavity of the preheating mold is preferably the same as a size of the above intermediate. Preheating can be conducted by, but not limited to, an electric resistance method.

The conditions in preheating of the intermediate can be adjusted, depending on the type of the adhesive. For example, when a urethane adhesive is used as the adhesive, a heating temperature is preferably 50 to 150° C. If the temperature is lower than 50° C., the adhesive may insufficiently cure, so that the intermediate may be brittle and thus difficult to handle. The temperature is more preferably 80° C. or higher. Meanwhile, if the temperature is higher than 150° C., the adhesive completely cures and water in the intermediate is completely evaporated, so that the cork grains may be difficult to expand. The temperature is more preferably 140° C. or less. When a urethane adhesive is used, a heating time is preferably 5 to 120 min. If the time is less than 5 min, the adhesive may insufficiently cure, so that the intermediate may be brittle and thus difficult to handle. The time is more preferably 10 min or more. Meanwhile, if the time is more than 120 min, the adhesive completely cures and water in the intermediate is completely evaporated, so that the cork grains may be difficult to expand. The time is more preferably 60 min or less.

The intermediate obtained is heated for expansion of the cork grains. Thus, a significant feature of the present invention is that the cork grains in the intermediate is expanded. When the intermediate is heated, water in the cork grains expands by vaporization and thus a force acts from the inside of the cork grains, so that the cork grains expand. Such expansion of the cork grains improves sealability and allows for smooth screwing of an opener and smooth removal of a stopper. For a conventional cork stopper produced by foaming an adhesive using a foaming agent such as thermally expandable microcapsules, the content may be contaminated with components derived from the foaming agent, leading problems in safety. In contrast, a production method of the present invention does not use such a foaming agent, so that a safe cork stopper can be obtained. Furthermore, expansion of the cork grains leads to reduction of its amount and thus cost reduction.

It is preferable that when the intermediate is heated for expansion of the cork grains, the intermediate is placed in a cavity of a mold for expansion (hereinafter, a mold for expansion is sometimes referred to as "a second mold"), and then the intermediate is heated for expansion of the cork grains. Here, a ratio of a volume of the second mold to a volume of the intermediate (cavity/intermediate) is preferably 1.01 to 1.5. Thus, the cork grains moderately expand, so that the cork grains adhere together, leading to improvement in sealability and smooth screwing of an opener and smooth removal of a stopper. If the ratio is less than 1.01, the cork grains cannot sufficiently expand, probably leading to insufficiently sealability and difficulty in screwing of an opener and removal of a stopper. The ratio is more preferably 1.03 or more. Meanwhile, if the ratio is more than 1.5, voids may increase in a cork stopper, leading to deterioration in sealability. The ratio is more preferably 1.3 or less.

In the above production method, it is more preferable that the approximately cylindrical intermediate with a diameter A (mm) is placed in the approximately cylindrical cavity of the second mold with a diameter B (mm), and A and B satisfy the following formula (1).

$$1.01 \leq B/A \leq 1.2 \tag{1}$$

By using the second mold having an approximately cylindrical cavity in which a diameter (outer diameter) A of the intermediate and a diameter (inner diameter) B of the cavity satisfy the above formula (1), the cork grains moderately expand, so that the cork grains adhere together, leading to improvement in sealability, smooth screwing of an opener and smooth removal of a stopper. If B/A is less than 1.01, cork grains cannot sufficiently expand, probably leading to insufficient sealability and difficulty in screwing of an opener and removal of a stopper. B/A is more preferably 1.02 or more. Meanwhile, if B/A is more than 1.2, voids may increase in a cork stopper, leading to deterioration in sealability. B/A is more preferably 1.15 or less.

In the above production process, it is preferable that the cork grains are expanded by internal heating of the intermediate, in the light of expansion by efficient heating of the cork grains. A method for internally heating the intermediate is preferably dielectric heating method such as microwave heating or high-frequency heating, more preferably microwave heating because the cork grains in the intermediate can be evenly heated.

When the intermediate is placed in the cavity of the second mold and then the intermediate is internally heated to expand the cork grains, the mold is a nonconductive mold made of Teflon® or the like.

Also preferred is a method for producing a cork stopper, comprising: mixing cork grains and an adhesive; compression molding the mixture to give an intermediate; placing the intermediate in the cavity of the mold for expansion at 0 to 40° C. while keeping the intermediate at 80° C. or higher; and allowing the intermediate to stand to expand the cork grains; wherein the intermediate is approximately cylindrical with a diameter C (mm); the cavity is approximately cylindrical with a diameter D (mm); and C and D satisfy the following formula (2).

$$1.01 \leq D/C \leq 1.2 \tag{2}$$

This method is sometimes referred to as "a second production method".

The second production method is advantageous in cost. There will be described the production method.

First, cork grains and an adhesive are mixed and then the mixture is compression molded to give an approximately cylindrical intermediate with a diameter C (mm). The intermediate can be produced as described for the first production method. Then, the intermediate is preheated in a cavity of a mold for compression molding or a heating mold as described for the first production method. Next, the preheated intermediate is placed in the cavity of a mold for expansion at 0 to 40° C. while keeping the intermediate at 80° C. or higher, and is allowed to stand to expand the cork grains. Here, immediately after the hot intermediate is removed from the cavity of the mold for compression molding or the heating mold, the hot intermediate must be placed in the cavity of the mold for expansion. It is believed that it allows the intermediate to expand by residual heat.

In the second production method, the intermediate is approximately cylindrical with a diameter C (mm); the cavity of the mold for expansion is approximately cylindrical with a diameter D (mm); and C and D must satisfy the above formula (2). By using the mold for expansion having an approximately cylindrical cavity in which a diameter (outer diameter) C of the intermediate and a diameter (inner diameter) D of the cavity satisfy the above formula (2), the cork grains moderately expand, so that the cork grains adhere together, leading to improvement in sealability, smooth screwing of an opener and smooth removal of a stopper. If D/C is less than 1.01, cork grains cannot sufficiently expand, probably leading to insufficient sealability and difficulty in screwing of an opener and removal of a stopper. D/C is more preferably 1.02 or more. Meanwhile, if D/C is more than 1.2, voids may increase in a cork stopper, leading to deterioration in sealability. D/C is more preferably 1.15 or less.

A cork stopper of the present invention is an approximately cylindrical cork stopper produced by mixing cork grains and an adhesive and then compression molding the mixture, wherein a filling rate of the cork grains in a cross section in a direction perpendicular to a rotation axis is 97% or more. With the filling rate of 97% or more, sealability is improved and screwing of an opener and removal of the stopper is smooth. The filling rate is preferably 98% or more. The cork stopper can be produced by, for example, the first production method or the second production method as described above. A filling rate of the cork grains can be determined as described in Examples later.

In the light of preventing breakage of a cork stopper when the stopper is removed, a strength $S_1$ in a rotation axis direction in the cork stopper is preferably 13.2 to 30 N/mm². The strength $S_1$ is more preferably 15 N/mm² or more. From the same viewpoint, a ratio ($S_2/S_1$) of a strength $S_2$ (N/mm²) in a direction perpendicular to a rotation axis to a strength $S_1$ (N/mm²) in a rotation axis direction is preferably 0.65 to 0.78. A strength of the cork stopper can be determined as described in Examples later.

In the light of improvement in sealability, a compression recovery rate $R_2$ in a direction perpendicular to a rotation axis in the cork stopper is preferably 75% or more, more preferably 78.5% or more. From the same viewpoint, a ratio ($R_2/R_1$) of a compression recovery rate $R_2$ (%) in a direction perpendicular to a rotation axis to a compression recovery rate $R_1$ (%) in a rotation axis direction is preferably 1.005 to 1.2. A compression recovery rate of the cork stopper can be determined as described in Examples later.

In the light of improvement in sealability, a compressibility $C_2$ in a direction perpendicular to a rotation axis in the cork stopper is preferably 23 to 50%. From the same viewpoint, a ratio ($C_2/C_1$) of a compressibility $C_2$ (%) in a direction perpendicular to a rotation axis to a compressibility $C_1$ (%) in a rotation axis direction is preferably 1.1 to 5. The ratio ($C_2/C_1$) is more preferably 1.5 or more, further preferably 2.0 or more. A compressibility of the cork stopper can be determined as described in Examples later.

A density of the cork stopper is preferably 0.26 to 0.32 g/cm³. With a density of the cork stopper being within such a range, balance between sealability and smoothness of screwing of an opener or removal of the stopper is good. The density is more preferably 0.28 g/cm³ or less, further preferably 0.275 g/cm³ or less.

A cork stopper of the present invention is highly sealable and safe. It can be, therefore, preferably used as a stopper for a beverage container such as a wine bottle and a whisky bottle, a food container, a chemical container and the like. According to a production method of the present invention, such a cork stopper can be conveniently produced.

EXAMPLES

The present invention will be further specifically described with reference to Examples.

Example 1

100 parts by mass of cork grains (No. 2 particle, particle size: 1 to 2 mm), 15 parts by mass of a urethane adhesive (HDI urethane) and 10 parts by mass of water are mixed to give a mixture. Using a molding apparatus described in JP 2010-99909 A (see FIGS. 2 to 6 in the publication), the mixture obtained was compression molded. The mixture was loaded into the cavity (molding space) of the first mold in the molding apparatus, and then compressed in a direction perpendicular to a rotation axis to give a cylindrical intermediate with a diameter of 25.5 mm and a length of 40 mm. Here, a compressibility (100×a volume of the intermediate after compression/a volume of the mixture before compression) was 57.5%. The intermediate obtained was loaded into a preheating mold (cylindrical container) having a cavity with the same dimensions as those of the intermediate. Then, the cylindrical container was allowed to stand in an electric resistance type oven at 130° C. for 15 min, to preheat the intermediate (see FIG. 5 in the publication).

The cylindrical container was removed from the oven, and the intermediate was pushed out from the preheating mold and loaded into the second mold made of Teflon® having a cylindrical cavity with a diameter of 26.5 mm and a length of 40 mm. The mold was placed in the microwave heating apparatus, and irradiated with microwave at an output of 3 kW for one minute, to expand the cork grains in the intermediate. The product was polished to give a cylindrical cork stopper with a diameter of 23.5 mm, a length of 38 mm and a density of 0.27 g/cm³.

[Cork Filling Rate]

Using a scanning electron microscope, a cross section perpendicular to a rotation axis in the middle of the cork stopper obtained was observed. FIG. 1 shows an electron microscope image of the cross section. Using a light microscope, a cross section perpendicular to a rotation axis in the middle of the cork stopper obtained was observed. FIG. 2 shows a light microscope image of the cross section. The upper and the lower images in FIG. 2 are images of the same part, and in the lower image, parts 1 such as adhesive parts and holes other than the cork are shown. An area of the part other than the cork was determined from the light microscope image of the cross section perpendicular to a rotation axis in the middle of the cork stopper, and then, a cork filling rate was calculated by the following equation and was 98.8%. Likewise, a cork filling rate was determined from the light microscope image of the cross section of the intermediate before expansion and was 96.0%. FIGS. 3 and 4 show an electron microscope image and a light microscope image of the cross section perpendicular to a rotation axis in the middle of the intermediate before expansion, respectively. The upper and the lower images in FIG. 4 are images of the same part, and in the lower image, parts 1 such as adhesive parts and holes other than the cork are shown.

Cork filling rate (%)=100×(a unit area−an area of the part other than the cork in the unit area)/ unit area

[Compressibility and Compression Recovery Rate of a Cork Stopper]

The middle of the cork stopper obtained was cut into a cubic sample with one side length of 1 cm. Here, the sample was cut out such that a rotation axis of the cork stopper is perpendicular to the top and under surfaces of the cube, and then the sample was compressed in the vertical direction under a load of 1 kg for one minute. Vertical lengths of the sample before and after compression were measured, and a compressibility $C_1$ in a rotation axis direction of the cork stopper was calculated from the following equation. A compressibility $C_1$ in a rotation axis direction of the cork stopper was 11.0%.

Compressibility $C_1$ (%)=100×(Length before compression−Length after compression)/Length before compression Furthermore, the sample after compression was allowed to stand for one minute and then a vertical length of the sample was measured, and then a compression recovery rate $R_1$ in a rotation axis direction of the cork stopper was calculated from the following equation. A compression recovery rate $R_1$ in a rotation axis direction of the cork stopper was 71.4%.

Compression recovery rate $R_1$ (%)=100×Length after standing/Length before compression A compressibility $C_2$ and a compression recovery rate $R_2$ in a direction perpendicular to a rotation axis of the cork stopper were determined as described above, except that the sample was compressed in the horizontal direction and a horizontal length was measured. A compressibility $C_2$ in a direction perpendicular to a rotation axis of the cork stopper was 24.9%. A compression recovery rate $R_2$ in a direction perpendicular to a rotation axis of the cork stopper was 79.6%.

[Strength of a Cork Stopper]

The middle of the cork stopper obtained was cut into a sample with a dimension of 1.5 cm (length)×1.5 cm (width)×2 mm (thickness). Here, the sample was cut out such that the vertical direction was a rotation axis direction of the cork stopper and the horizontal direction was a direction perpendicular to a rotation axis of the cork stopper. By measuring a tensile strength for each sample using a tensile tester (interchuck distance: 10 mm, tension rate: 300 mm/min), a strength $S_1$ (N/mm$^2$) in a rotation axis direction and a strength $S_2$ (N/mm$^2$) in a direction perpendicular to a rotation axis for the cork stopper were measured. A strength $S_1$ in a rotation axis direction of the cork stopper was 16.2 N/mm$^2$, and a strength $S_2$ in a direction perpendicular to a rotation axis was 11.7 N/mm$^2$.

[Evaluation of Screwing of an Opener]

Feeling when an opener was screwed to the cork stopper obtained was evaluated in accordance with the following criteria. The results are shown in Table 1.

A: The opener smoothly screwed with good feeling.

B: The opener gave feeling of creaking, that is, bad feeling.

[Force for Removal of a Stopper]

A wine bottle (inner diameter: 19 mm) was sealed with the cork stopper obtained, and then the cork stopper was pulled out using an opener. At the time, the opener was connected to a tensile tester for measurement of the maximum load applied, which was 187 N.

[Evaluation of Permeability and Liquid Leak]

A wine bottle (inner diameter: 19 mm) was filled with wine and then sealed with the cork stopper obtained. The wine bottle was put sideways such that wine was in contact with the cork stopper, and allowed to stand for 6 days while it was stepwisely warmed (30° C. for 2 days, 35° C. for 2 days, and 40° C. for 2 days). After allowing to stand at room temperature for an additional day, the cork stopper was visually observed and wine permeability was evaluated in accordance with the following criteria. Furthermore, from weights of the bottle before and after standing, liquid leak was inspected. The results are shown in Table 1.

A: Wine little permeated the cork stopper.

B: Wine permeated to the middle of the cork stopper.

C: Wine permeated to the upper part of the cork stopper.

[Sealability]

Sulfurous acid gas was introduced to a wine bottle (inner diameter: 19 mm) to 100 ppm and then the bottle was sealed with the cork stopper obtained. After 16 weeks, the amount of sulfurous acid gas in the wine bottle was measured, and was 94.0 ppm.

Example 2

An intermediate was produced and loaded in a Teflon® mold as described in Example 1. The mold was placed in a high-frequency dielectric heater, and irradiated with high-frequency wave at an output of 3 kW and a frequency of 2850 MHz for one minute, to expand the cork grains in the intermediate. Then, the product was polished to give a cylindrical cork stopper with a diameter of 23.5 mm, a length of 38 mm and a density of 0.27 g/cm$^3$. Evaluation of the cork stopper obtained [strength (only in a rotation axis direction), compressibility (only in a direction perpendicular to a rotation axis), a compression recovery rate (only in a direction perpendicular to a rotation axis), evaluation of screwing of an opener, and evaluation of a force for removal of the stopper, permeability and liquid leak] was conducted as described in Example 1. The results are shown in Table 1.

Example 3

The process until preheating of an intermediate was conducted as described in Example 1, except that the intermediate was preheated at 140° C. for 15 min. The cylindrical container was removed from the oven and the intermediate was pushed out from the cylindrical container and then loaded in a Teflon® mold (20 to 30° C.) having a cylindrical cavity with a diameter of 26.5 mm and a length of 40 mm. Here, the intermediate was loaded to the mold while being kept at 100° C. or higher. After being allowed to stand in the mold for 30 min, the intermediate was polished to give a cylindrical cork stopper with a diameter of 23.5 mm, a length of 38 mm and a density of 0.28 g/cm$^3$. Evaluation of the cork stopper obtained [a filling rate of the cork grains, strength (only in a rotation axis direction), compressibility (only in a direction perpendicular to a rotation axis), a compression recovery rate (only in a direction perpendicular to a rotation axis), evaluation of screwing of an opener, and evaluation of a force for removal of the stopper, permeability and liquid leak] was conducted as described in Example 1. The results are shown in Table 1.

Comparative Example 1

100 parts by mass of cork grains (particle size: 0.5 to 2 mm), 40 parts by mass of a urethane adhesive (TDI urethane), 10 parts by mass of thermally expandable microcapsules (microspheres comprising an outer shell made of a copolymer of methyl methacrylate and acrylonitrile and isobutane in the interior of the shell) and 10 parts by mass of water were mixed. The mixture obtained was loaded in a mold having a cylindrical cavity with a diameter of 25.5 mm and a length of 40 mm. After keeping it at 130° C. for 15 min, the product was polished to give a cylindrical cork stopper with a diameter of 23.5 mm, a length of 38 mm and a density of 0.28 g/cm$^3$. The cork stopper obtained was evaluated as described in Example 1 [a filling rate of the cork grains, strength (only in a rotation axis direction), compressibility (only in a direction perpendicular to a rotation axis), a compression recovery rate (only in a direction perpendicular to a rotation axis), evaluation of screwing of an opener, evaluation of a force for removal of the stopper, permeability, liquid leak, and sealability]. The results are shown in Table 1. FIGS. 5 and 6 show an electron microscope image and a light microscope image of the cross section perpendicular to a rotation axis in the middle of the cork stopper, respectively. The upper and the lower images in FIG. 6 are images of the same part, and in the lower image, parts 1 such as adhesive parts and holes other than the cork are shown.

Comparative Example 2

A cork stopper was produced and evaluated [a filling rate of the cork grain, strength (only in a rotation axis direction), compressibility (only in a direction perpendicular to a rotation axis), a compression recovery rate (only in a direction perpendicular to a rotation axis), evaluation of screwing of an opener, evaluation of a force for removal of the stopper, permeability, liquid leak, and sealability] as described in Example 1, except that an adhesive was an epoxy adhesive and its amount was 5 parts by mass, and cork grains were No. 2 (particle size: 2 to 3 mm) cork grains, and microwave irradiation was omitted. The results are shown in Table 1. FIGS. 7 and 8 show an electron microscope image and a light microscope image of the cross section perpendicular to a rotation axis in the middle of the cork stopper, respectively. The upper and the lower images in FIG. 8 are images of the same part, and in the lower image, parts 1 such as adhesive parts and holes other than the cork are shown.

TABLE 1

|  |  |  | Example 1 | Example 2 | Example 3 | Comparative Example 1 | Comparative Example 2 |
|---|---|---|---|---|---|---|---|
| Composition | Cork | Particle size (mm) | 1-2 | 1-2 | 1-2 | 0.5-2 | 2-3 |
|  |  | parts by mass | 100 | 100 | 100 | 100 | 100 |
|  | Adhesive | Type | HDI urethane | HDI urethane | HDI urethane | TDI urethane | Epoxy |
|  |  | parts by mass | 15 | 15 | 15 | 40 | 5 |
|  | Water | parts by mass | 10 | 10 | 10 | 10 | 10 |
|  | Foaming agent | parts by mass | — | — | — | 10 | — |
| Expansion method |  |  | Microwave | High-frequency wave | Residual heat | Foaming agent | — |
| Filling rate of cork grains (%) |  |  | 98.8[1] 96.0[2] | — | — | 81.6 | 94.8 |
| Physical properties | Rotation axis direction | Strength $S_1$ (N/mm$^2$) | 16.2 | 16.6 | 13.5 | 13 | 11.1 |
|  | Direction perpendicular to a rotation axis | Compressibility $C_2$ (%) | 24.9 | 23.6 | 24.2 | 25 | 22.1 |
|  |  | Compression recovery rate $R_2$ (%) | 79.6 | 78.8 | 76.4 | 78 | 70.9 |
|  | Density (g/cm$^3$) |  | 0.27 | 0.27 | 0.28 | 0.28 | 0.30 |
| Evaluation | Force for removal of a stopper (N) |  | 187 | 171 | 189 | 256 | 220 |
|  | Amount of residual sulfurous acid gas (ppm) |  | 94.0 | — | — | 90.8 | 92.0 |
|  | Liquid leak |  | No | No | No | No | Yes |
|  | Opener screwing |  | A | A | A | A | B |
|  | Permeability |  | A | A | A | B | C |

[1]Cork grain filling rate after expansion,
[2]Cork grain filling rate before expansion

EXPLANATION OF REFERENCES

1: Part other than cork grains

The invention claimed is:

1. A method for producing a cork stopper, comprising:
mixing cork grains and an adhesive;
compression molding the mixture to give an intermediate;
placing the intermediate in a cavity of a mold; and
then internally heating the intermediate to expand the cork grains, wherein the internally heating is microwave heating or high-frequency heating.

2. The production method as claimed in claim 1, wherein the cork grains are expanded by microwave heating of the intermediate.

3. The production method as claimed in claim 1, wherein the cork grains are expanded by high-frequency heating of the intermediate.

4. The production method as claimed in claim 1, wherein the intermediate is approximately cylindrical, and the cork grains and the adhesive are mixed and then compression molded while being compressed in a direction perpendicular to a rotation axis.

5. The production method as claimed in claim 1, wherein the approximately cylindrical intermediate with a diameter A (mm) is placed in the approximately cylindrical cavity with a diameter B (mm), and A and B satisfy the following formula (1):

$$1.01 \leq B/A \leq 1.2 \quad (1).$$

6. The production method as claimed in claim 1, wherein the adhesive is a urethane adhesive.

7. The production method as claimed in claim 1, wherein a ratio of a volume of the cavity to a volume of the intermediate is 1.01 to 1.5.

8. The production method as claimed in claim 1, wherein the mold is a nonconductive mold.

9. The production method as claimed in claim 1, wherein the compression molding is carried out in another mold that is different from the mold.

10. The production method as claimed in claim 1, wherein the intermediate is preheated before being placed in the cavity of the mold.

11. The production method as claimed in claim 1, wherein the intermediate is preheated in a preheating mold before being placed in the cavity of the mold.

12. The production method as claimed in claim 11, wherein a cavity of the preheating mold has a same size as the intermediate.

13. The production method as claimed in claim 11, wherein the preheating mold has a temperature of 50° C. to 150° C.

14. A method for producing a cork stopper, comprising:
mixing cork grains and an adhesive;
compression molding the mixture to give an intermediate;
placing the intermediate in a cavity of a mold at 0 to 40° C. while keeping the intermediate at 80° C. or higher; and
allowing the intermediate to stand to expand the cork grains;
wherein
the intermediate is approximately cylindrical with a diameter C (mm), the cavity is approximately cylindrical with a diameter D (mm), and C and D satisfy the following formula (2):

$$1.01 \leq D/C \leq 1.2 \quad (2).$$

* * * * *